US012450747B2

(12) United States Patent
Kuen et al.

(10) Patent No.: US 12,450,747 B2
(45) Date of Patent: Oct. 21, 2025

(54) PERFORMING MULTIPLE SEGMENTATION TASKS (71) Applicant: Adobe Inc., San Jose, CA (US)

(72) Inventors: Jason Wen Yong Kuen, San Jose, CA (US); Zhe Lin, Clyde Hill, WA (US); Sukjun Hwang, Seoul (KR); Jianming Zhang, Fremont, CA (US); Brian Lynn Price, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 422 days.

(21) Appl. No.: 18/100,419

(22) Filed: Jan. 23, 2023

(65) Prior Publication Data
US 2024/0249413 A1 Jul. 25, 2024

(51) Int. Cl.
G06T 7/11 (2017.01)

(52) U.S. Cl.
CPC ...... *G06T 7/11* (2017.01); *G06T 2207/20081* (2013.01); *G06T 2207/20104* (2013.01)

(58) Field of Classification Search
CPC ............. G06T 7/11; G06T 2207/20081; G06T 2207/20104
See application file for complete search history.

(56) References Cited

U.S. PATENT DOCUMENTS

| | | | | |
|---|---|---|---|---|
| 11,200,650 | B1* | 12/2021 | Ben Zadok | G06N 3/04 |
| 11,640,705 | B1* | 5/2023 | Acharya | G06V 20/30 |
| | | | | 382/155 |
| 12,159,410 | B2* | 12/2024 | Ye | G06N 3/084 |
| 12,182,713 | B2* | 12/2024 | Zhao | G06N 20/00 |
| 12,299,844 | B2* | 5/2025 | Zhang | G06T 7/194 |
| 2020/0167690 | A1* | 5/2020 | Zhao | G06N 3/084 |
| 2021/0065337 | A1* | 3/2021 | Bai | G06F 18/2148 |
| 2021/0141997 | A1* | 5/2021 | Pinnamaneni | G06F 16/9566 |
| 2023/0040908 | A1* | 2/2023 | Kiyasseh | G06N 3/08 |
| 2023/0196755 | A1* | 6/2023 | He | G06V 10/7715 |
| | | | | 382/156 |

(Continued)

OTHER PUBLICATIONS

Bar, Amir , et al., "DETReg: Unsupervised Pretraining with Region Priors for Object Detection", Cornell University arXiv, arXiv.org [retrieved Dec. 13, 2022]. Retrieved from the Internet <https://arxiv.org/pdf/2106.04550.pdf>., Jun. 2021, 14 Pages.

(Continued)

*Primary Examiner* — Mia M Thomas
(74) *Attorney, Agent, or Firm* — FIG. 1 Patents (57) ABSTRACT

In implementations of systems for performing multiple segmentation tasks, a computing device implements a segment system to receive input data describing a digital image depicting an object. The segment system computes per-pixel embeddings for the digital image using a pixel decoder of a machine learning model. Output embeddings are generated using a transformer decoder of the machine learning model based on the per-pixel embeddings for the digital image, input embeddings for a first segmentation task and input embeddings for a second segmentation task. The segment system outputs a first digital image and a second digital image. The first digital image depicts the object segmented based on the first segmentation task and the second digital image depicts the object segmented based on the second segmentation task.

20 Claims, 10 Drawing Sheets

(56) References Cited

U.S. PATENT DOCUMENTS

| | | | | |
|---|---|---|---|---|
| 2023/0222643 A1* | 7/2023 | Wu | ............... | G06V 10/26 |
| | | | | 382/108 |
| 2023/0222778 A1* | 7/2023 | Acharya | ............ | G06V 10/7747 |
| | | | | 382/155 |
| 2023/0401716 A1* | 12/2023 | Wang | ............... | G06N 3/045 |
| 2023/0401717 A1* | 12/2023 | Wang | ............... | G06V 20/70 |
| 2023/0401718 A1* | 12/2023 | Wei | ............... | G06V 10/462 |
| 2024/0127410 A1* | 4/2024 | Lin | ............... | G06T 7/11 |
| 2024/0127411 A1* | 4/2024 | Lin | ............... | G06T 5/77 |
| 2024/0127412 A1* | 4/2024 | Lin | ............... | G06T 7/11 |
| 2024/0127452 A1* | 4/2024 | Lin | ............... | G06V 20/70 |
| 2024/0127509 A1* | 4/2024 | Hold-Geoffroy | ..... | G06T 3/4046 |
| 2024/0135509 A1* | 4/2024 | Liu | ............... | G06T 5/77 |
| 2024/0135510 A1* | 4/2024 | Liu | ............... | G06V 10/945 |
| 2024/0135511 A1* | 4/2024 | Singh | ............... | G06N 3/02 |
| 2024/0135514 A1* | 4/2024 | Pakhomov | ............... | G06T 5/60 |
| 2024/0135561 A1* | 4/2024 | Ding | ............... | G06V 10/26 |
| 2024/0135613 A1* | 4/2024 | Ding | ............... | G06V 10/25 |
| 2024/0169500 A1* | 5/2024 | Zheng | ............... | G06T 5/77 |
| 2024/0169541 A1* | 5/2024 | Zhang | ............... | G06T 7/11 |
| 2024/0169623 A1* | 5/2024 | Zeng | ............... | G06T 11/60 |
| 2024/0169624 A1* | 5/2024 | Brandt | ............... | G06T 11/60 |
| 2024/0169631 A1* | 5/2024 | Kim | ............... | G06T 11/001 |
| 2024/0232614 A1* | 7/2024 | Esmaeili | ............... | G06N 3/044 |
| 2024/0404090 A1* | 12/2024 | Hold-Geoffroy | ......... | G06T 7/80 |
| 2024/0404138 A1* | 12/2024 | Zhang | ............... | G06T 7/11 |
| 2024/0404188 A1* | 12/2024 | Zhang | ............... | G06T 15/506 |
| 2025/0022099 A1* | 1/2025 | Song | ............... | G06T 5/50 |
| 2025/0086849 A1* | 3/2025 | Zeng | ............... | G06V 20/70 |
| 2025/0226102 A1* | 7/2025 | Ghosh | ............... | G06T 7/174 |

OTHER PUBLICATIONS

Carion, Nicolas, et al., "End-to-End Object Detection with Transformers", Computer Vision—ECCV 2020: 16th European Conference, Glasgow, UK [retrieved Dec. 13, 2022]. Retrieved from the Internet <https://www.ecva.net/papers/eccv_2020/papers_ECCV/papers/123460205.pdf>., May 28, 2020, 26 Pages.

Cheng, Bowen, et al., "Masked-attention Mask Transformer for Universal Image Segmentation", Cornell University arXiv, arXiv.org [retrieved Mar. 15, 2023]. Retrieved from the Internet <https://arxiv.org/pdf/2112.01527.pdf>., Jun. 15, 2022, 20 Pages.

Ghiasi, Golnaz, et al., "Multi-Task Self-Training for Learning General Representations", IEEE/CVF International Conference on Computer Vision [retrieved Dec. 13, 2022]. Retrieved from the Internet <https://arxiv.org/pdf/2108.11353.pdf>., Oct. 2021, 10 Pages.

* cited by examiner

PERFORMING MULTIPLE SEGMENTATION TASKS

BACKGROUND

Image segmentation refers to a variety of different techniques for grouping portions of a digital image into particular groups or segments. Specific techniques for image segmentation are referred to as types of segmentation tasks. For example, a semantic segmentation task assigns a class label to each pixel of the digital image whereas an instance segmentation task classifies instances of objects depicted in the digital image. In this example, if the digital image depicts two cat objects, then performing the semantic segmentation task assigns pixels of each of the cat objects with a same class label of "cat" and performing the instance segmentation task classifies one cat object as "cat1" and the other cat object as "cat2."

SUMMARY

Techniques and systems for performing multiple segmentation tasks are described. In an example, a computing device implements a segment system to receive input data describing a digital image depicting an object. The segment system computes per-pixel embeddings for the digital image using a pixel decoder of a machine learning model.

For example, the segment system generates output embeddings using a transformer decoder of the machine learning model based on the per-pixel embeddings for the digital image, input embeddings for a first segmentation task, and input embeddings for a second segmentation task. A first digital image and a second digital image are output based on the output embeddings. The first digital image depicts the object segmented based on the first segmentation task and the second digital image depicts the object segmented based on the second segmentation task.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional systems for performing N different image segmentation tasks generally require N different models which are each trained on training data to perform one of the image segmentation tasks. As a result, a total computational cost to perform the N different image segmentation tasks is equal to a sum of a computational cost at inference for each of the N different models which is inefficient. In order to overcome this limitation, techniques and systems for performing multiple segmentation tasks are described.

In a first example, a computing device implements a segment system to receive input data describing a digital image depicting an object. In a second example, the segment system receives the input data describing a user annotation of the digital image depicting the object. In both examples, the segment system includes or has access to a machine learning model that is simultaneously trained on multiple training datasets to perform multiple image segmentation tasks. For example, the segment system simultaneously trains the machine learning model on a panoptic segmentation dataset to perform a panoptic segmentation task, an instance segmentation dataset to perform an instance segmentation task, a semantic segmentation dataset to perform a semantic segmentation task, a salient object segmentation dataset to perform a salient object segmentation task, a human body parsing dataset to perform a human body parsing task, a pose estimation dataset to perform a pose estimation task, a depth estimation dataset to perform a depth estimation task, and so forth.

As part of training the machine learning model, input embeddings are learned for the multiple image segmentation tasks. In some examples, the machine learning model learns the input embeddings for the multiple image segmentation tasks by leveraging information learned for related segmentation tasks while being simultaneously trained on the multiple training datasets. In one example, information learned from training the machine learning model to perform the instance segmentation task is useful for learning to perform the panoptic segmentation task. In another example, information learned from training the machine learning model to perform the pose estimation task is useful for learning to perform the human body parsing task.

In the first example in which the segment system receives the input data as describing the digital image depicting the object, the segment system extracts low resolution image features from the input data using a backbone (e.g., a convolutional neural network, a transformer, etc.) of the trained machine learning model. In this first example, the segment system encodes the extracted low resolution image features using a transformer encoder of the trained machine learning model. A pixel encoder of the trained machine learning model up-samples the encoded low resolution image features to generate high resolution per-pixel embeddings for the digital image.

Continuing the first example, a transformer decoder of the trained machine learning model receives data describing image features under transformation from the pixel encoder. For example, the segment system implements the transformer decoder to process the data describing the image features under transformation and the input embeddings for the multiple segmentation tasks to generate task embeddings. In an example, the transformer decoder processes input embeddings for a first segmentation task, a second segmentation task, and a third segmentation task to generate task embeddings for the first segmentation task, the second segmentation task, and the third segmentation task.

Returning to the first example, the segment system leverages the trained machine learning model to generate output embeddings based on the high resolution per-pixel embeddings for the digital image and the task embeddings for the first, second, and third segmentation tasks. The segment system generates a first digital image, a second digital image, and a third digital image using the output embeddings. For instance, the first digital image depicts the object segmented based on the first segmentation task; the second digital image depicts the object segmented based on the second segmentation task; and the third digital image depicts the object segmented based on the third segmentation task.

In the second example in which the segment system receives the input data describing the user annotation of the digital image depicting the object, the segment system processes the input data to extract and encode the low resolution image features as in the first example. For example, the user annotation of the digital image is a bounding box specified relative to the object depicted in the digital image. In this example, a user interacts with an input device (a mouse, a stylus, a touchscreen, a keyboard, etc.) relative to a user interface to specify the bounding box relative to the object depicted in the digital image.

Continuing the second example, in order to account for the bounding box, the segment system performs region of interest align operations with respect to the bounding box as the low resolution image features are transformed and up-sampled by the pixel decoder of the trained machine learning model. The segment system generates interactive input embeddings based on the region of interest align operations. For example, the transformer encoder of the trained machine learning model processes the input embeddings including the interactive input embeddings to generate the task embeddings as including an interactive task embedding.

The segment system implements the trained machine learning model to generate the output embeddings based on the high resolution per-pixel embeddings for the digital image and the task embeddings. The segment system generates a fourth digital image using the output embeddings. For example, the fourth digital image depicts the object segmented based on the user annotation.

Unlike conventional systems for performing N different image segmentation tasks with the N different models at the computational cost equal to the sum of the computational cost at inference for each of the N different models, the described systems for performing multiple segmentation tasks are capable of performing the N different image segmentation tasks using the trained machine learning model. As a result of this improvement, the described systems are capable of generating N different digital images for the N different image segmentation tasks at a total computational cost which is approximately 80 percent lower than the conventional systems. Additionally, the described systems are also capable of performing the N different image segmentation tasks as including interactive segmentation tasks based on user annotations which is a further improvement relative to the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
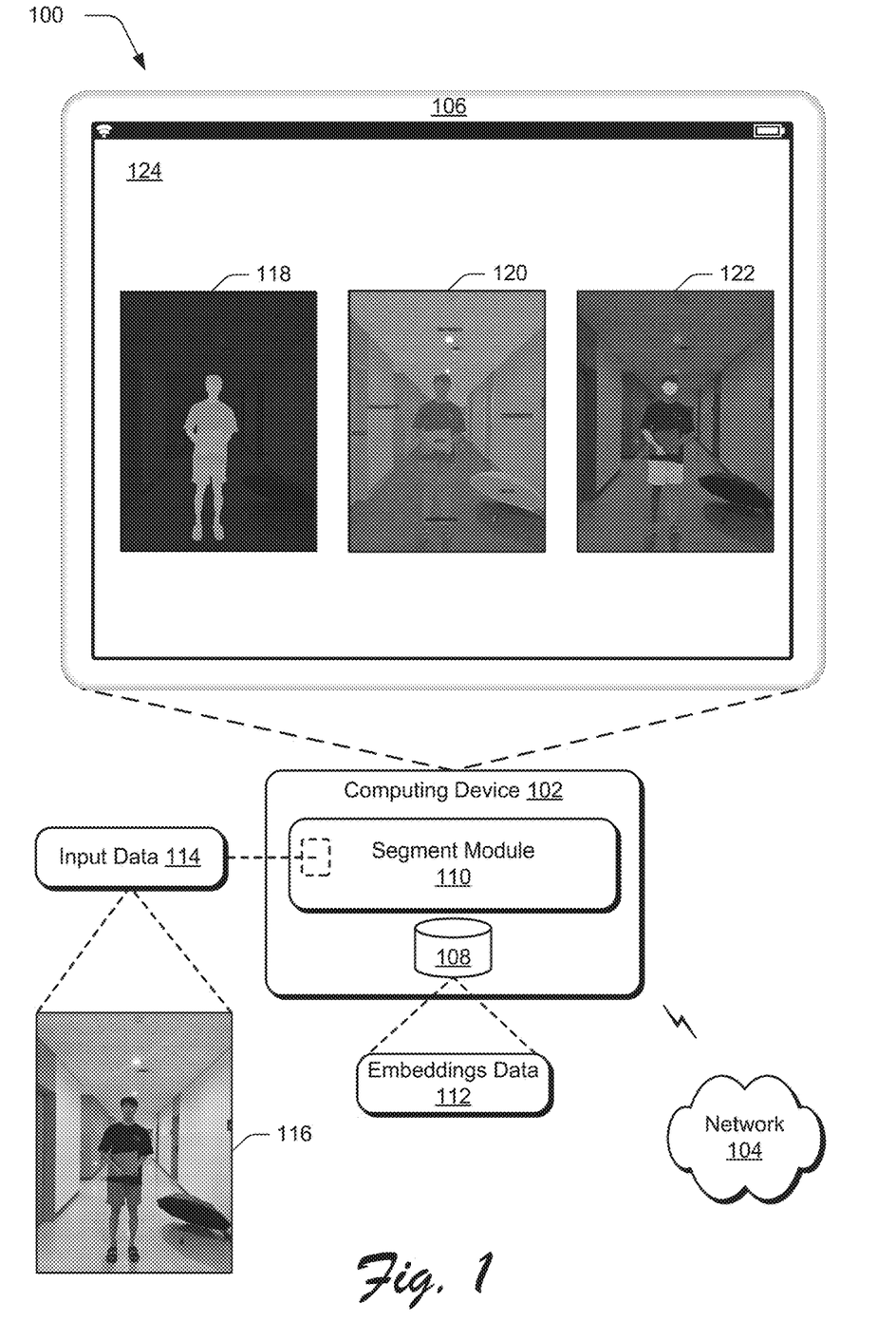
FIG. 1 is an illustration of an environment in an example implementation that is operable to employ digital systems and techniques for performing multiple segmentation tasks as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a segment module 110. The storage device 108 is illustrated to include embeddings data 112 that describes input embeddings learned as part of training a machine learning model.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the segment module 110 includes the machine learning model, and the segment module 110 trains the machine learning model on training data to perform multiple segmentation tasks. In this example, the training data describes multiple different training datasets such as a training dataset for each of the multiple segmentation tasks. In one example, the segment module 110 simultaneously trains the machine learning model on a panoptic segmentation dataset to perform a panoptic segmentation task, an instance segmentation dataset to perform an instance segmentation task, a semantic segmentation dataset to perform a semantic segmentation task, a salient object segmentation dataset to perform a salient object segmentation task, a human body parsing dataset to perform a human body parsing task, a pose estimation dataset to perform a pose estimation task, a depth estimation dataset to perform a depth estimation task, and so forth. In other examples, the segment module 110 is capable of training the machine learning model using the training data describing the multiple training datasets such that the machine learning model learns to perform more than one segmentation task on a single training dataset described by the training data.

The segment module 110 is illustrated as having, receiving, and/or transmitting input data 114 describing a digital image 116. As shown, the digital image 116 depicts objects such as a person standing in a hallway, a laptop held by the person, and an open umbrella lying next to the person. The segment module 110 receives and processes the input data 114 using the machine learning model and the input embeddings described by the embeddings data 112 to perform multiple segmentation tasks.

To do so in one example, the segment module 110 extracts low resolution features from the digital image 116 using a backbone and encodes the extracted features using a transformer encoder of the machine learning model. In this example, the segment module 110 processes the low resolution features using a pixel decoder of the machine learning model to compute per-pixel embeddings for the digital image 116. A transformer decoder of the machine learning model receives image features under transformation from the pixel decoder and input embeddings for a salient object segmentation task, input embeddings for a panoptic segmentation task, and input embeddings for a human body parsing task described by the embeddings data 112. Output embeddings are generated or decoded based on the per-pixel embeddings and the input embeddings for the salient object segmentation task, the input embeddings for the panoptic segmentation task, and the input embeddings for the human body parsing task.

For example, the segment module 110 implements the machine learning model to generate digital images 118-122 which are displayed in a user interface 124 of the display device 106 based on the output embeddings. As shown, digital image 118 depicts the person and the laptop segmented based on the salient object segmentation task. Digital image 120 depicts the objects depicted in the digital image 116 segmented based on the panoptic segmentation task. For instance, digital image 122 depicts portions of the person segmented based on the human body parsing task.

By simultaneously training the machine learning model on the training data to perform multiple segmentation tasks, the segment module 110 implements the trained machine learning model to generate the digital images 118-122 at a significantly reduced computational cost compared to conventional systems that separately train the machine learning model to perform each of the multiple segmentation tasks. For example, a computational cost to generate the digital images 118-122 when the machine learning model is separately trained on training data describing the salient object segmentation dataset to perform the salient object segmentation task, the panoptic segmentation dataset to perform the panoptic segmentation task, and the human body parsing dataset to perform the human body parsing task is approximately 80 percent greater than the computational cost to generate the digital image 118-122 using the described systems for performing multiple segmentation tasks. In some examples, in addition to the reduced computational cost, the segment module 110 also generates the digital images 118-122 with improved segmentation accuracy compared to the conventional systems. In these examples, the improved accuracy is due to simultaneously training the machine learning model to perform multiple segmentation tasks which causes the model to leverage information learned from related segmentation tasks to perform the related segmentation tasks with greater accuracy.

Figure 2:
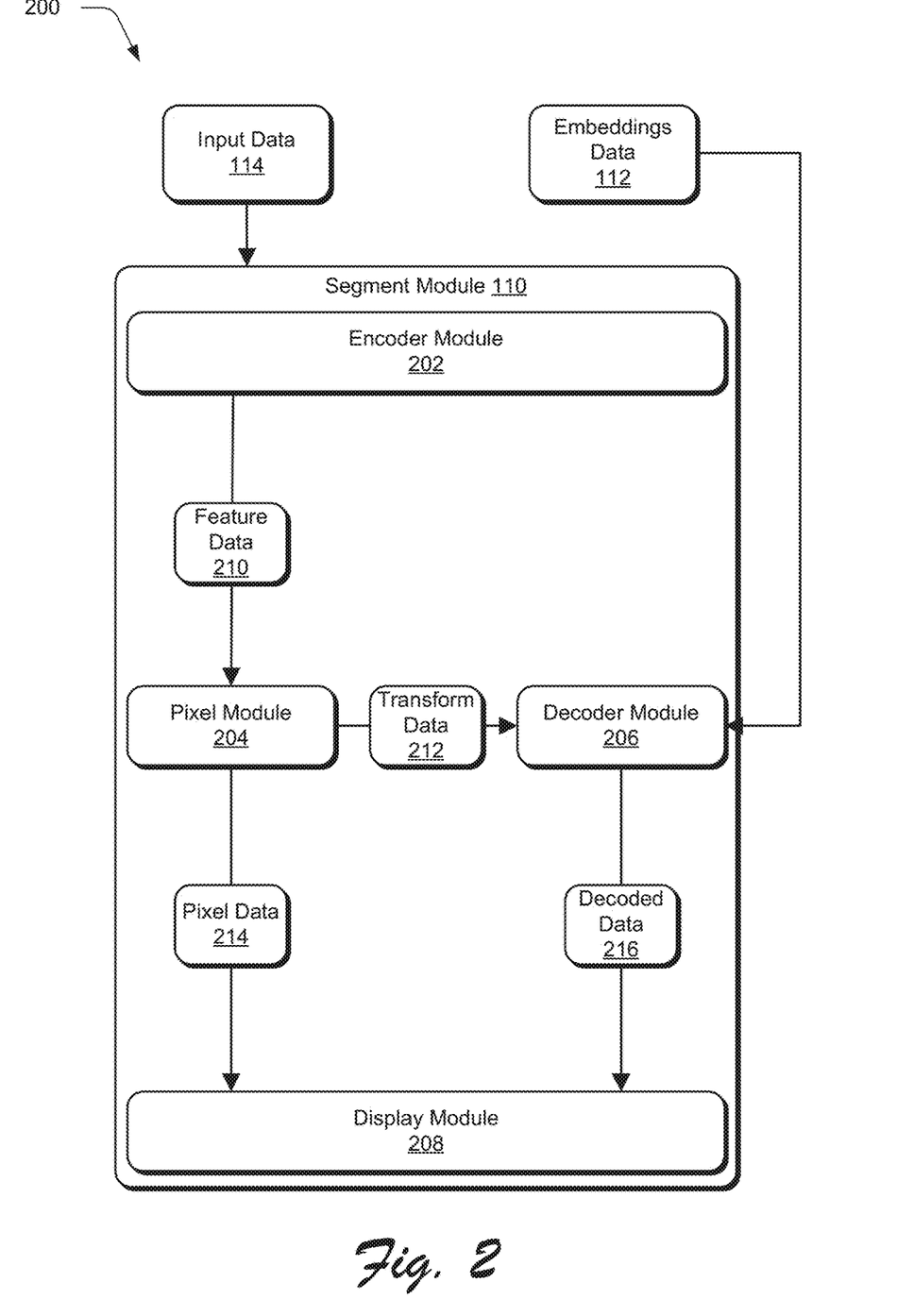
FIG. 2 depicts a system in an example implementation showing operation of a segment module for performing multiple segmentation tasks.

FIG. 2 depicts a system 200 in an example implementation showing operation of a segment module 110. The segment module 110 is illustrated to include an encoder module 202, a pixel module 204, a decoder module 206, and a display module 208. For example, the segment module 110 receives the input data 114 and the embeddings data 112 as inputs.

Figure 3:
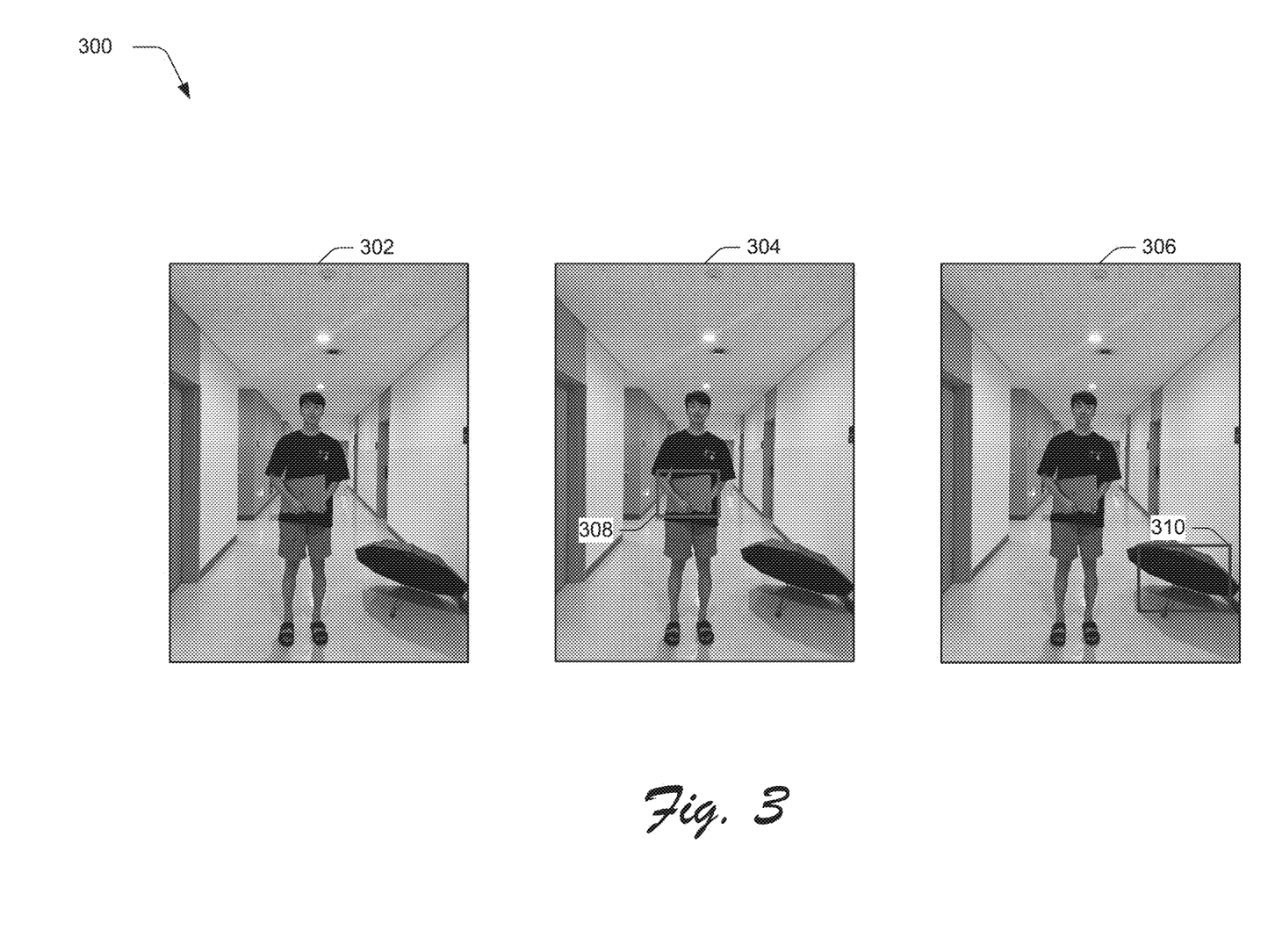
FIG. 3 illustrates a representation of input data examples.

FIG. 3 illustrates a representation 300 of input data examples. The representation 300 includes digital images 302-306. In some examples, the input data 114 describes digital image 302 which depicts the person standing in the hallway holding the laptop next to the umbrella. In other examples, the input data describes digital image 304 which depicts the person standing in the hallway next to the umbrella while holding the laptop and also depicts a user annotation 308 specified relative to the digital image 304. For example, a user interacts with an input device (e.g., a mouse, a stylus, a touchscreen, a keyboard, a microphone, etc.) to specify the user annotation 308 which is a bounding box for the laptop. In a similar example, the input data 114 describes digital image 306 which depicts the person standing in the hallway holding the laptop next to the umbrella and a user annotation 310 specified relative to the digital image 306. In this example, the user annotation 310 is a bounding box for the umbrella.

Figure 4:
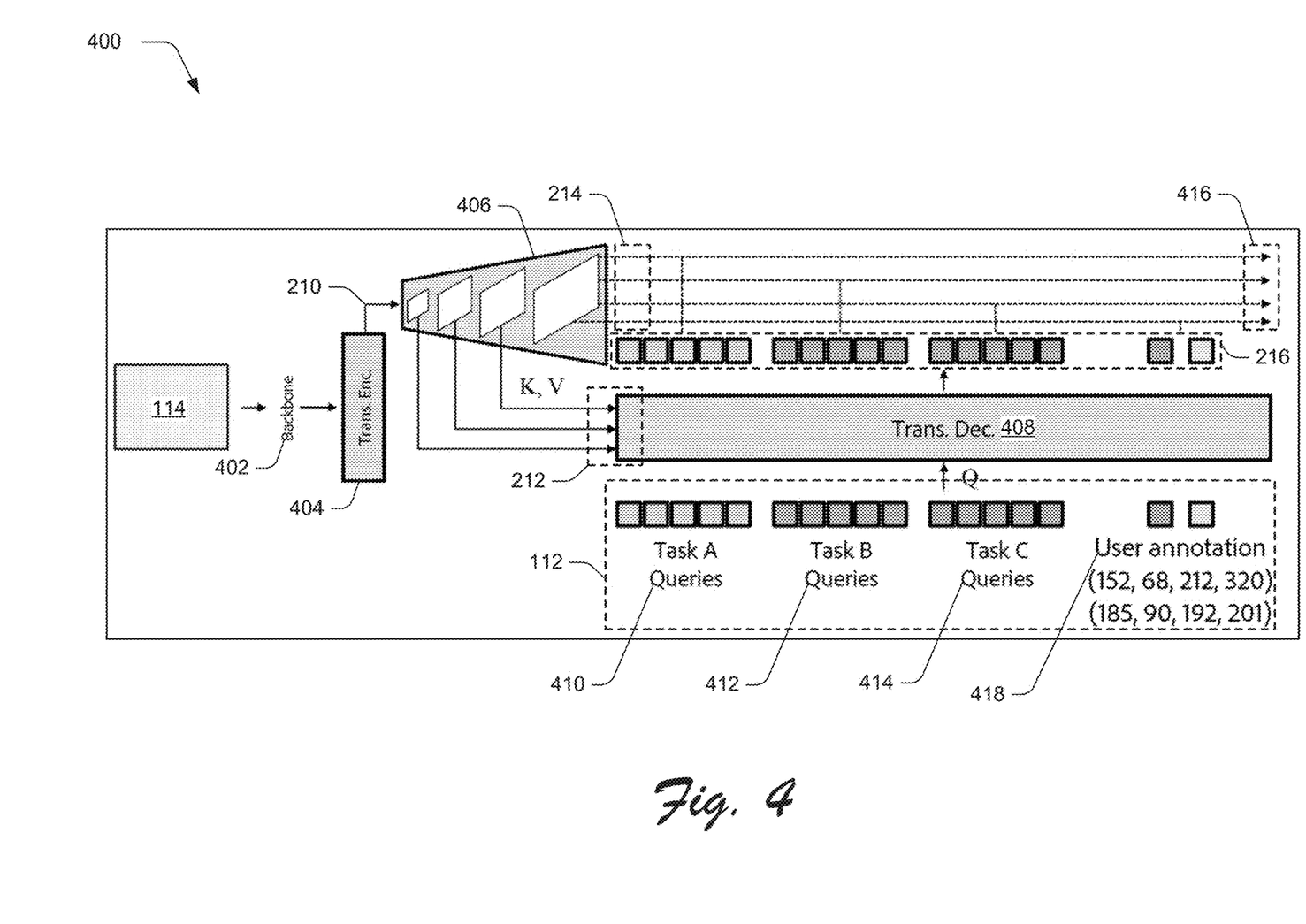
FIG. 4 illustrates a representation of a machine learning model.

FIG. 4 illustrates a representation 400 of a machine learning model. For example, the machine learning model is included in or available to the segment module 110, and the segment module 110 trains the machine learning model on training data to perform multiple segmentation tasks. The machine learning model learns input embeddings (also referred to as task queries) for the multiple segmentation tasks described by the embeddings data 112 based on the training.

In some examples, the training data describes multiple different training datasets such as a training dataset for each of the multiple segmentation tasks. In an example, the segment module 110 simultaneously trains the machine learning model on a panoptic segmentation dataset to perform a panoptic segmentation task, an instance segmentation dataset to perform an instance segmentation task, a semantic segmentation dataset to perform a semantic segmentation task, a salient object segmentation dataset to perform a salient object segmentation task, a human body parsing dataset to perform a human body parsing task, a pose estimation dataset to perform a pose estimation task, and a depth estimation dataset to perform a depth estimation task. Since the machine learning model is simultaneously trained on the training data to perform the multiple segmentation tasks, the machine learning model leverages information learned for related segmentation tasks to perform these tasks with greater accuracy compared to conventional systems that separately train a machine learning model to perform each segmentation task. For instance, information learned for performing the instance segmentation task is also useful for performing the panoptic segmentation task, information learned for performing the human body parsing task is also useful for performing the pose estimation task, and so forth.

For example, the trained machine learning model is illustrated in the representation 400. In a first example, the encoder module 202 receives the input data 114 as describing the digital image 302 which does not include the user annotations 308, 310. In this example, the encoder module 202 includes a backbone 402 and a transformer encoder 404 of the machine learning model. The backbone 402 includes an architecture or a network for feature extraction such as a convolutional neural network, a transformer, and so forth. The encoder module 202 processes the input data 114 using the backbone 402 to extract image features from the digital image 302. In one example, the encoder module 202 encodes the extracted image features as feature data 210 using the transformer encoder 404.

The pixel module 204 receives and processes the feature data 210 to generate transform data 212 and pixel data 214. For example, the pixel module 204 includes a pixel decoder 406 of the machine learning model. As shown in FIG. 4, the pixel module 204 implements the pixel decoder 406 to transform image features described by the feature data 210, and the pixel decoder 406 generates the transform data 212 as describing image features under transformation. The pixel decoder 406 also generates the pixel data 214 as describing per-pixel embeddings for the digital image 302. In an example, the images features of the digital image 302 are extracted and encoded as low resolution image features described by the feature data 210, and the pixel decoder 406 up-samples the low resolution image features to generate the pixel data 214 as describing high resolution per-pixel embeddings for the digital image 302.

For instance, the decoder module 206 receives the transform data 212 describing the image features under transformation and the embeddings data 112 describing the input embeddings (e.g., the task queries) learned as part of training the machine learning model on the training data. In an example, the decoder module 206 includes a transformer decoder 408 of the machine learning model. As illustrated in the representation 400, the embeddings data 112 describes first input embeddings 410 for a first segmentation task, second input embeddings 412 for a second segmentation task, and third input embeddings 414 for a third segmentation task. The decoder module 206 implements the transformer decoder 408 to attend to the image features under transformation described by the transform data 212 and to process the first input embeddings 410, the second input embeddings 412, and the third input embeddings 414 to generate decoded data 216 as describing task embeddings.

The display module 208 receives the pixel data 214 describing the per-pixel embeddings for the digital image 302 and the decoded data 216 describing the task embeddings. For example, the display module 208 processes the pixel data 214 and the decoded data 216 to generate output embeddings 416. In this example, the display module 208 combines the pixel data 214 and the decoded data 216 in order to generate the output embeddings 416. In one example, the display module 208 generates the output embeddings 416 by applying the task embeddings to feature maps of the per-pixel embeddings. In the first example in which the input data 114 describes the digital image 302, the display module 208 is capable of using the output embeddings 416 to generate digital images which depict objects depicted in the digital image 302 segmented based on the first, second, and third segmentation tasks.

Consider a second example in which the input data 114 describes the digital image 304 that depicts the user annotation 308 and/or the digital image 306 that depicts the user annotation 310. In this second example, the segment module 110 computes and leverages interactive input embeddings 418 for performing interactive segmentation tasks. In an example, the interactive input embeddings 418 are usable to generate a digital image depicting the laptop segmented based on the user annotation 308. In a similar example, the interactive input embeddings 418 are usable to generate a digital image depicting the umbrella segmented based on the user annotation 310.

Figure 5:
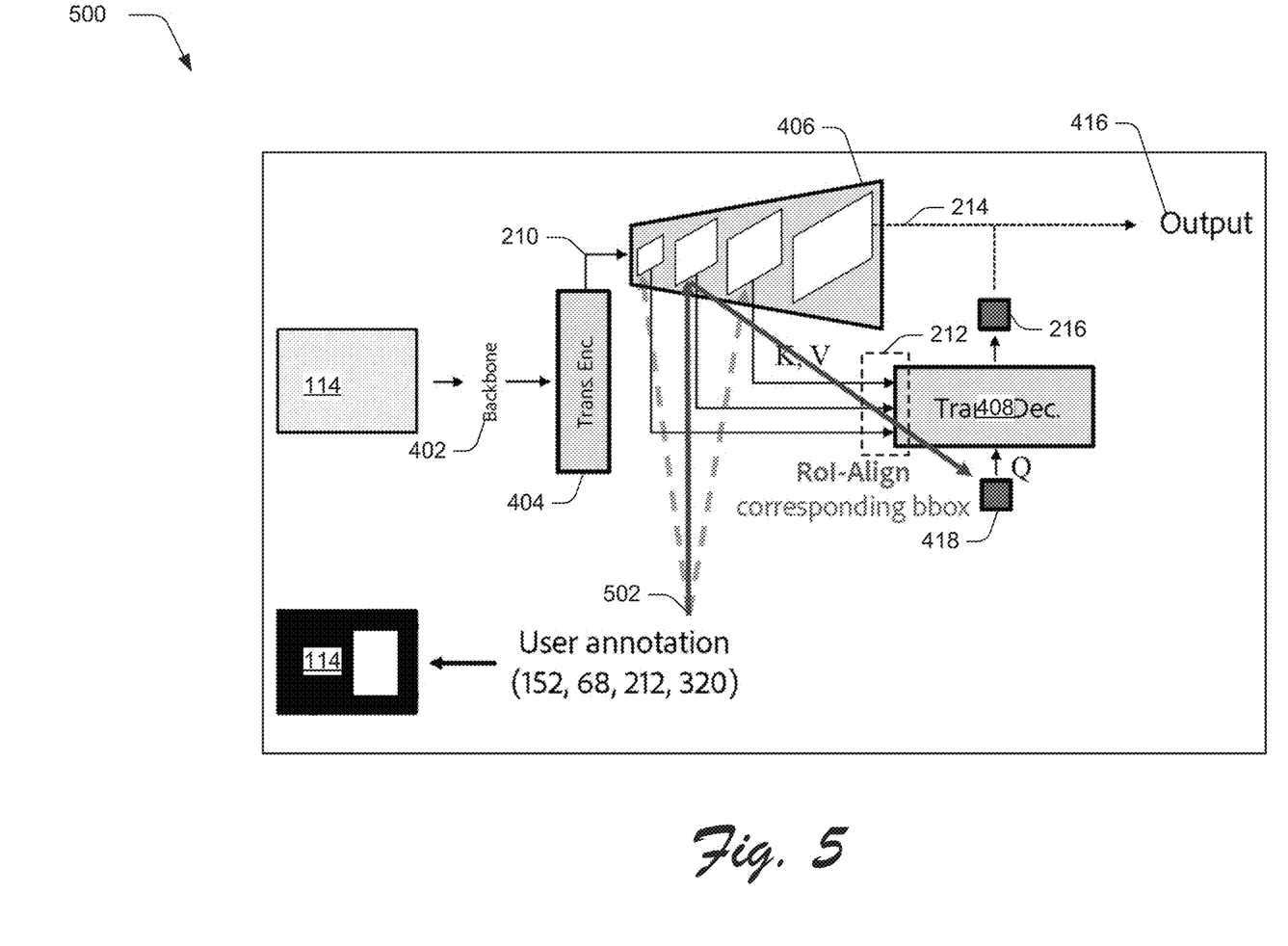
FIG. 5 illustrates a representation of generating input embeddings based on a user input specified relative to a digital image.

FIG. 5 illustrates a representation 500 of generating input embeddings based on a user input specified relative to a digital image. As shown in the representation 500, the input data 114 describes the digital image 304 that depicts the user annotation 308 which is the bounding box for the laptop. The encoder module 202 processes the input data 114 to generate the feature data 210 in a manner similar to the first example described with respect to the digital image 302. The pixel module 204 implements the pixel decoder 406 to transform image features described by the feature data 210.

In order to account for the bounding box for the laptop in one example, the segment module 110 performs a region of interest align operation 502. For example, the segment module 110 generates the interactive input embeddings 418 based on the region of interest align operation 502. Notably, in some examples, the segment module 110 does not generate a bitmap for the user annotation 308 in response to receiving the input data 114 as describing the digital image 304. Rather, in these examples, the segment module 110 represents the user annotation 308 via the interactive input embeddings 418 by performing the region of interest align operation 502. The decoder module 206 implements the transformer decoder 408 of the machine learning model to generate the decoded data 216 as describing the task embeddings which include interactive task embeddings based on the interactive input embeddings 418. The display module 208 receives and processes the pixel data 214 describing the per-pixel embeddings for the digital image 304 and the decoded data 216 describing the task embeddings to generate the output embeddings 416.

Figure 6A:
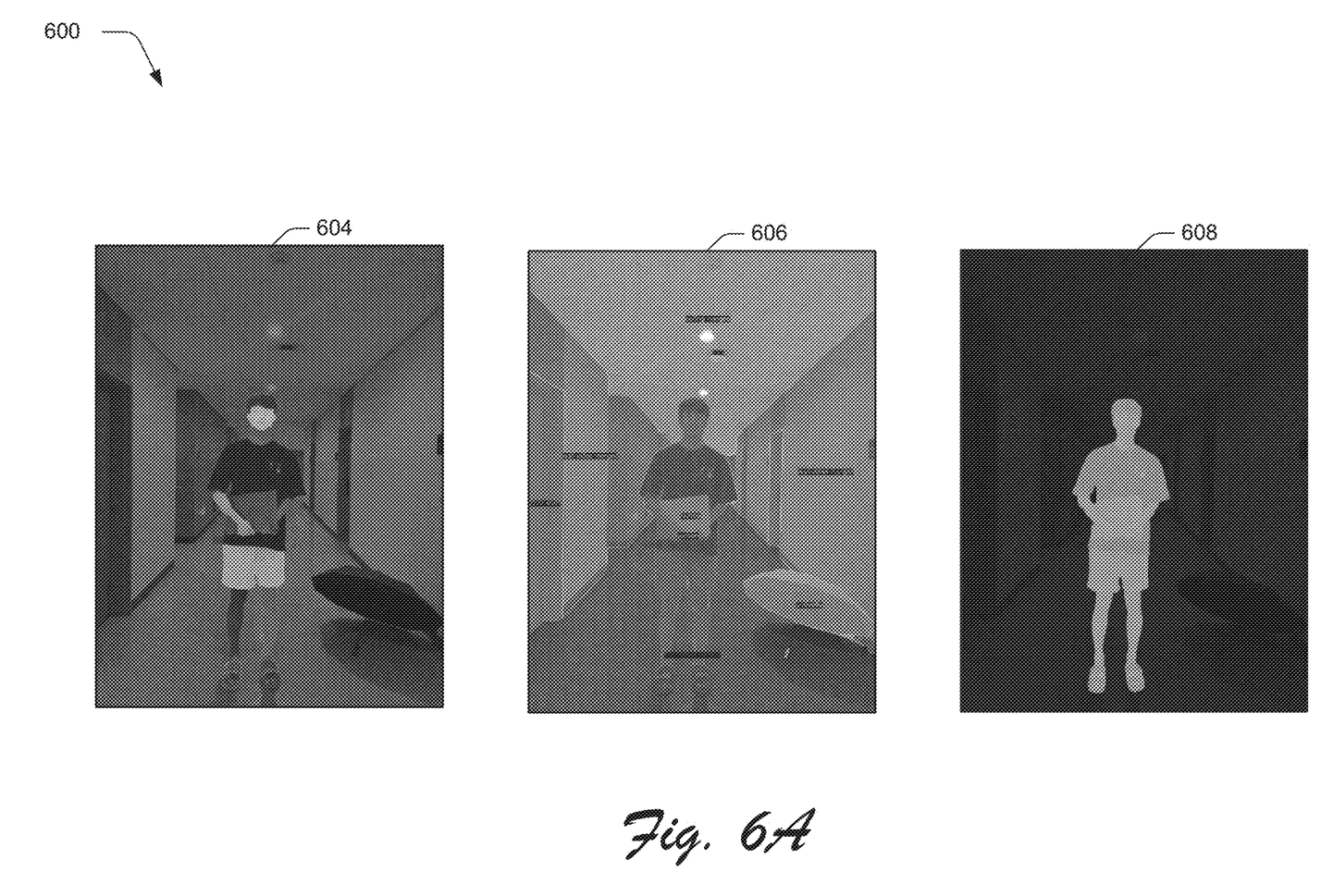
FIGS. 6A and 6B illustrate examples of digital images generated by performing multiple segmentation tasks.
Figure 6B:
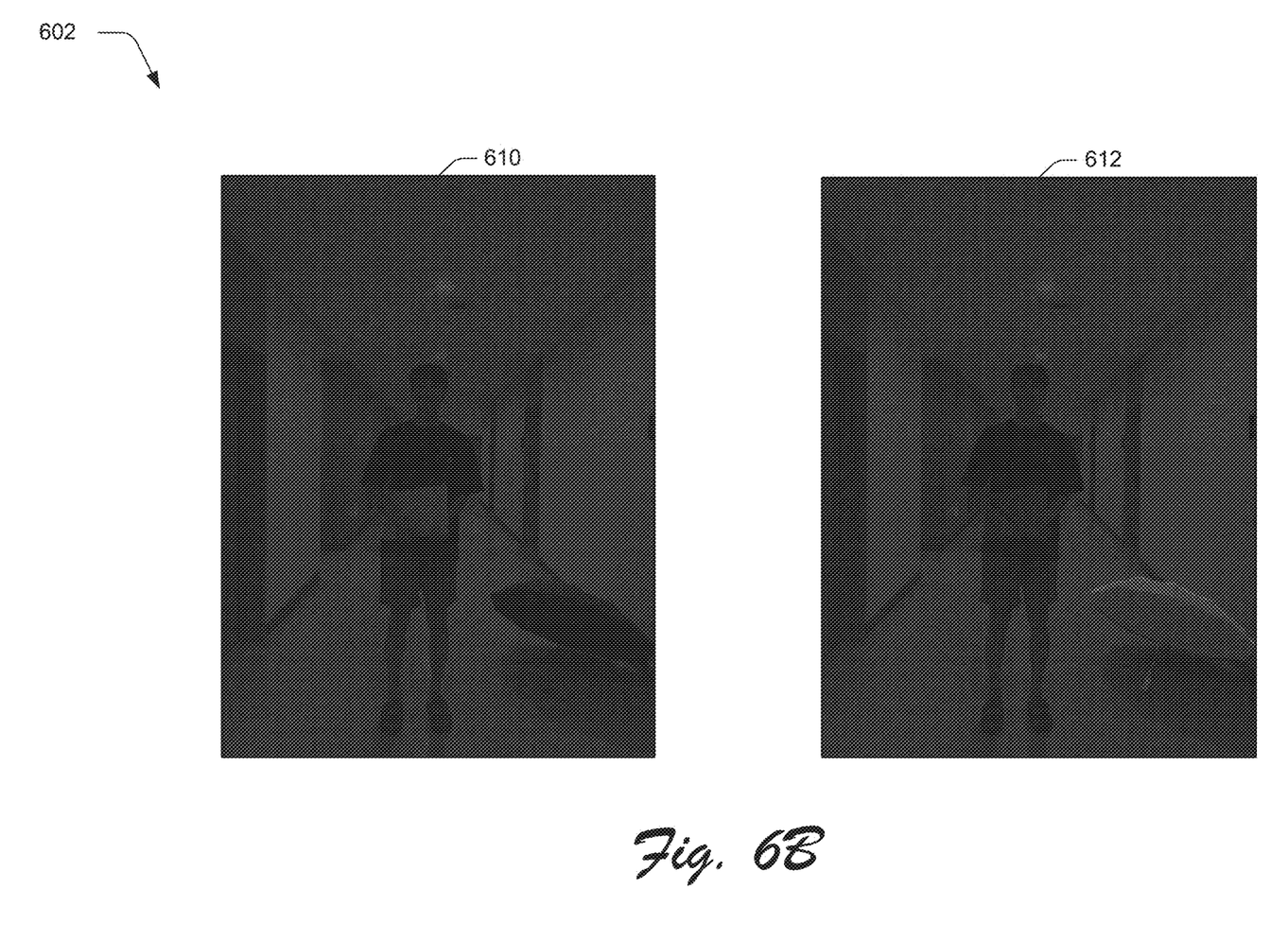

FIGS. 6A and 6B illustrate examples of digital images generated by performing multiple segmentation tasks. FIG. 6A illustrates a representation 600 of digital images generated by performing segmentation tasks relative to input data 114 describing the digital image 302. FIG. 6B illustrates a representation 602 of digital images generated by performing segmentation tasks relative to input data 114 describing the digital images 304, 306.

The representation 600 includes digital images 604-608. Digital image 604 is generated by performing a human body parsing task on the digital image 302. As shown, the digital image 604 depicts portions of the person depicted in the digital image 302 segmented based on the human body parsing task. A computational cost to generate the digital image 604 using conventional systems that are separately trained to perform a single segmentation task (e.g., the human body parsing task) is approximately 211 giga floating point operations per second (GFLOPs).

For instance, digital image 606 is generated by performing a panoptic segmentation task on the digital image 302. A computational cost associated with generating the digital image 606 using the conventional systems is approximately 223 GFLOPs. Digital image 608 is generated by performing a salient object segmentation task on the digital image 302. In an example, a computational cost to generate the digital image 608 is approximately 199 GFLOPS.

The representation 602 includes digital images 610, 612. Digital image 610 is generated by performing an interactive segmentation task on the digital image 304. As shown, the digital image 610 depicts the laptop segmented based on the interactive segmentation task. A computational cost to generate the digital image 610 using the conventional systems is approximately 206 GFLOPS.

Digital image 612 is generated by performing an interactive segmentation task on the digital image 306. For example, the digital image 612 depicts the umbrella segmented based on the interactive segmentation task. A computational cost associated with generating the digital image using the conventional systems is approximately 206 GFLOPS.

A total computational cost to generate the digital images 604-612 using the conventional systems is approximately 1045 GFLOPS. However, the described systems for performing multiple segmentation tasks are capable of generating the digital images 604-612 with a total computational cost of approximately 233 GFLOPS. This represents a reduction in computational cost of approximately 80 percent relative to the conventional systems. Further, the described systems are capable of generating some of the digital images 604-612 with an improved segmentation accuracy relative to the conventional systems. For example, the segment module 110 generates the digital image 606 with greater accuracy than the conventional systems.

Although the reduction in the total computational cost of about 80 percent described above is computed based on generating the digital images 604-612 using the described systems for performing multiple segmentation tasks versus generating each of the digital images 604-612 using multiple conventional systems which are each trained to perform a single segmentation task, it is to be appreciated that the improvements of the described systems generally increase as a number of segmentation tasks performed is increased. For example, training the machine learning model to perform an additional segmentation task and generating an additional digital image corresponds to a computational cost at inference which further reduces an overall computational cost relative to generating the additional digital image using an additional conventional system trained to perform the additional segmentation task. It is also to be appreciated that in some examples, it may be desirable to perform a subset of the multiple segmentation tasks that the described systems are capable of performing.

Consider an example in which the user manipulates the input device relative to a user interface such as the user interface 124 to interact with user interface elements to indicate that the digital image 608 should not be generated. In this example, the segment module 110 generates digital images 604,606,610,612. For example, the segment module 110 saves some intermediate data generated as part of generating the digital images 604,606,610,612 such as the feature data 210 and/or the transform data 212. After generating the digital images 604,606,610,612, the user interacts with the input device relative to the user interface to indicate that the digital image 608 should be generated. Continuing this example, the segment module 110 is capable of leveraging the saved feature data 210 and/or transform data 212 to generate the digital image 608 with a reduced time at inference relative to generating the digital image 608 using a conventional system trained to perform a single segmentation task.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
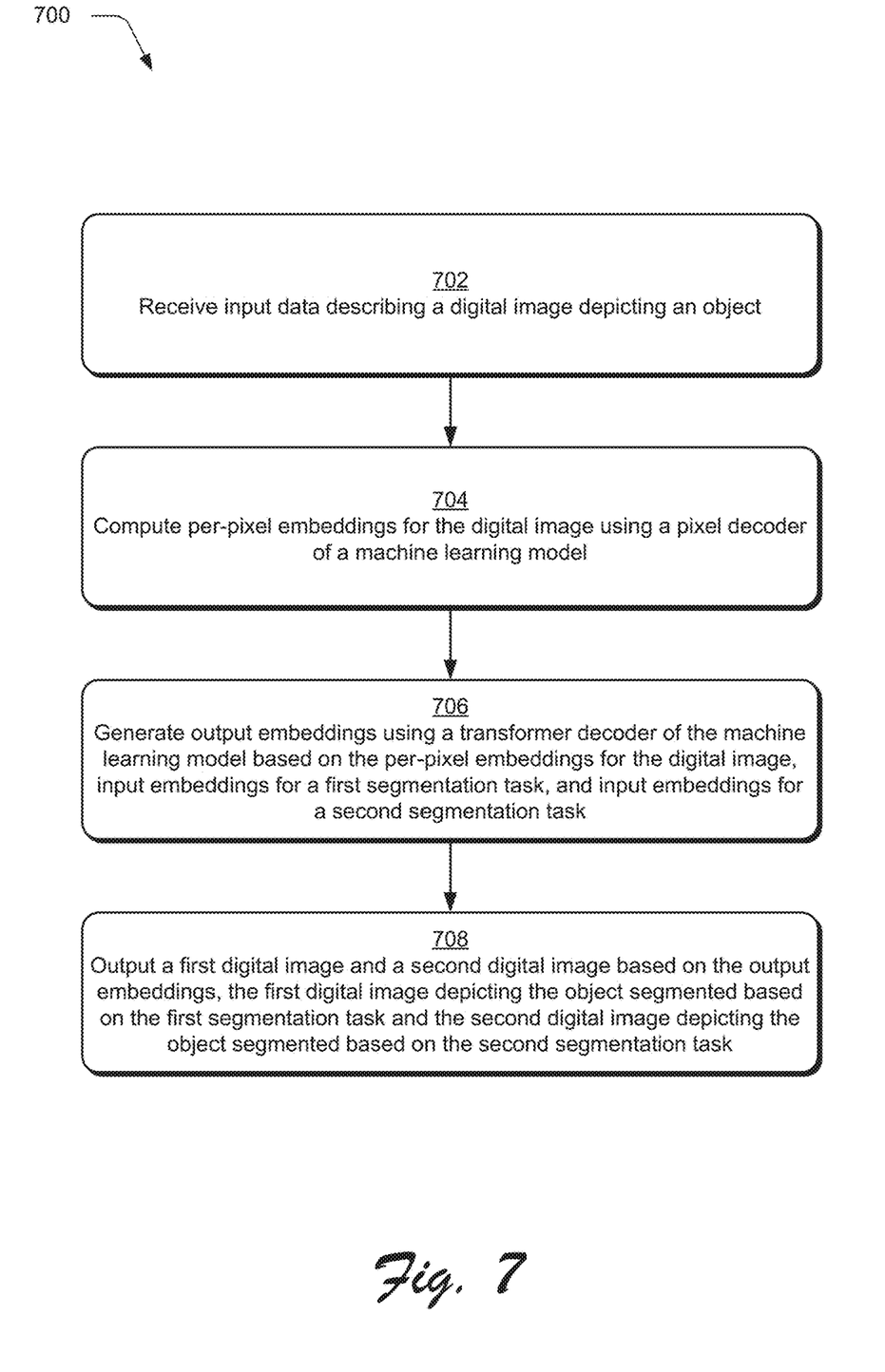
FIG. 7 is a flow diagram depicting a procedure in an example implementation in which a first digital image is generated as depicting an object segmented based on a first segmentation task and a second digital image is generated as depicting the object segmented based on a second segmentation task.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 7 is a flow diagram depicting a procedure 700 in an example implementation in which a first digital image is generated as depicting an object segmented based on a first segmentation task and a second digital image is generated as depicting the object segmented based on a second segmentation task.

Input data is received describing a digital image depicting an object (block 702). For example, the computing device 102 implements the segment module 110 to receive the input data. Per-pixel embeddings for the digital image are computed using a pixel decoder of a machine learning model (block 704). In one example, the segment module 110 computes the per-pixel embeddings for the digital image using the pixel decoder.

Output embeddings are generated using a transformer decoder of the machine learning model based on the per-pixel embeddings for the digital image, input embeddings for a first segmentation task, and input embeddings for a second segmentation task (block 706). In some examples, the segment module 110 generates the output embeddings. A first digital image and a second digital image are output based on the output embeddings, the first digital image depicting the object segmented based on the first segmentation task and the second digital image depicting the object segmented based on the second segmentation task (block 708). In one example, the computing device 102 implements the segment module 110 to output the first digital image and the second digital image.

Figure 8:
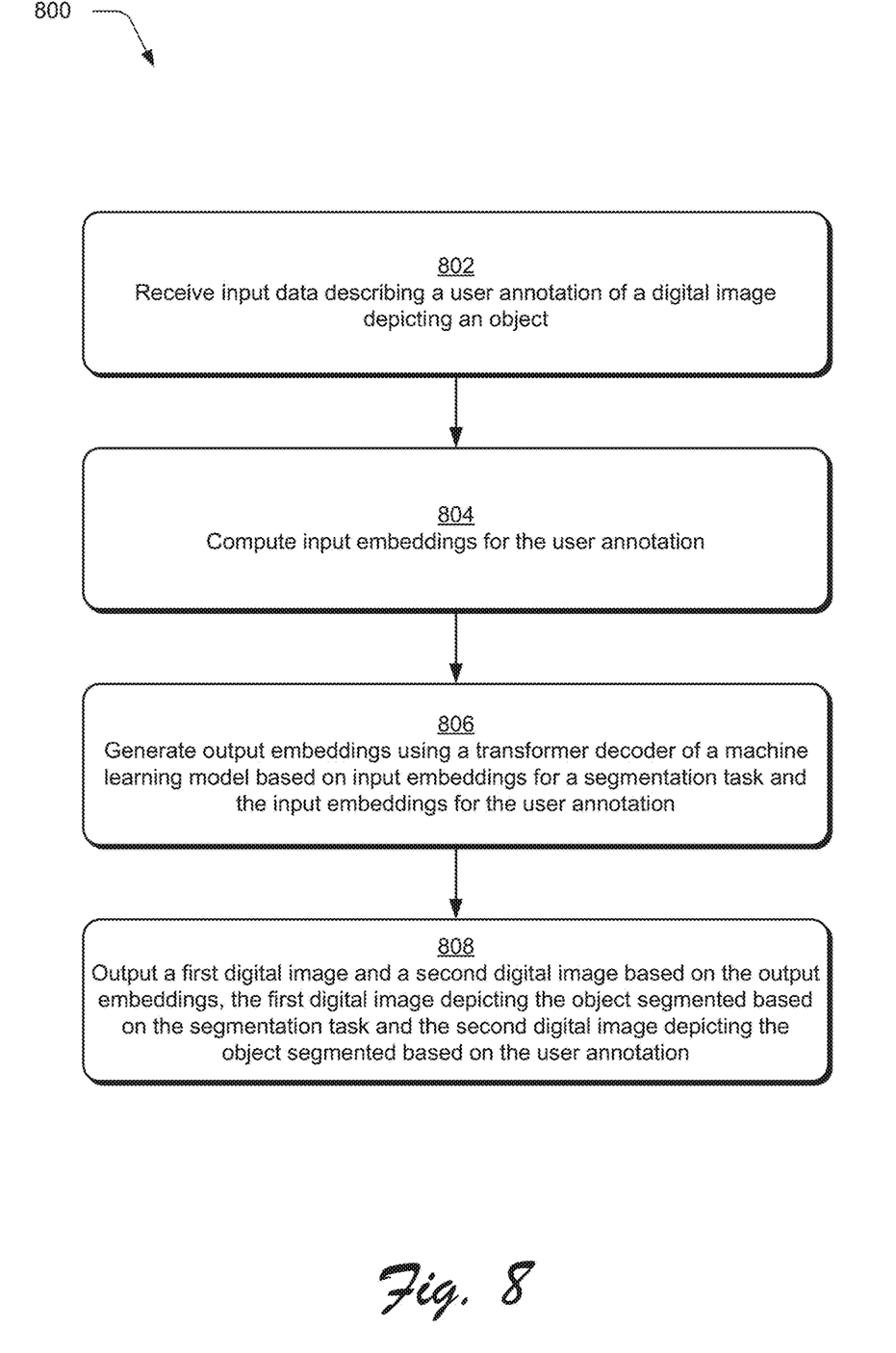
FIG. 8 is a flow diagram depicting a procedure in an example implementation in which a first digital image is generated as depicting an object segmented based on a segmentation task and a second digital image is generated as depicting the object segmented based on a user annotation.

FIG. 8 is a flow diagram depicting a procedure 800 in an example implementation in which a first digital image is generated as depicting an object segmented based on a segmentation task and a second digital image is generated as depicting the object segmented based on a user annotation. Input data is received describing a user annotation of a digital image depicting an object (block 802). In some examples, the segment module 110 receives the input data. Input embeddings are computed for the user annotation (block 804). For example, the computing device 102 implements the segment module 110 to compute the input embeddings for the user annotation.

Output embeddings are generated using a transformer decoder of a machine learning model based on input embeddings for a segmentation task and the input embeddings for the user annotation (block 806). In an example, the segment module 110 generates the output embeddings. A first digital image and a second digital image are output based on the output embeddings, the first digital image depicting the object segmented based on the segmentation task and the second digital image depicting the object segmented based on the user annotation (block 808). The segment module 110 outputs the first digital image and the second digital image in one example.

Example System and Device

Figure 9:
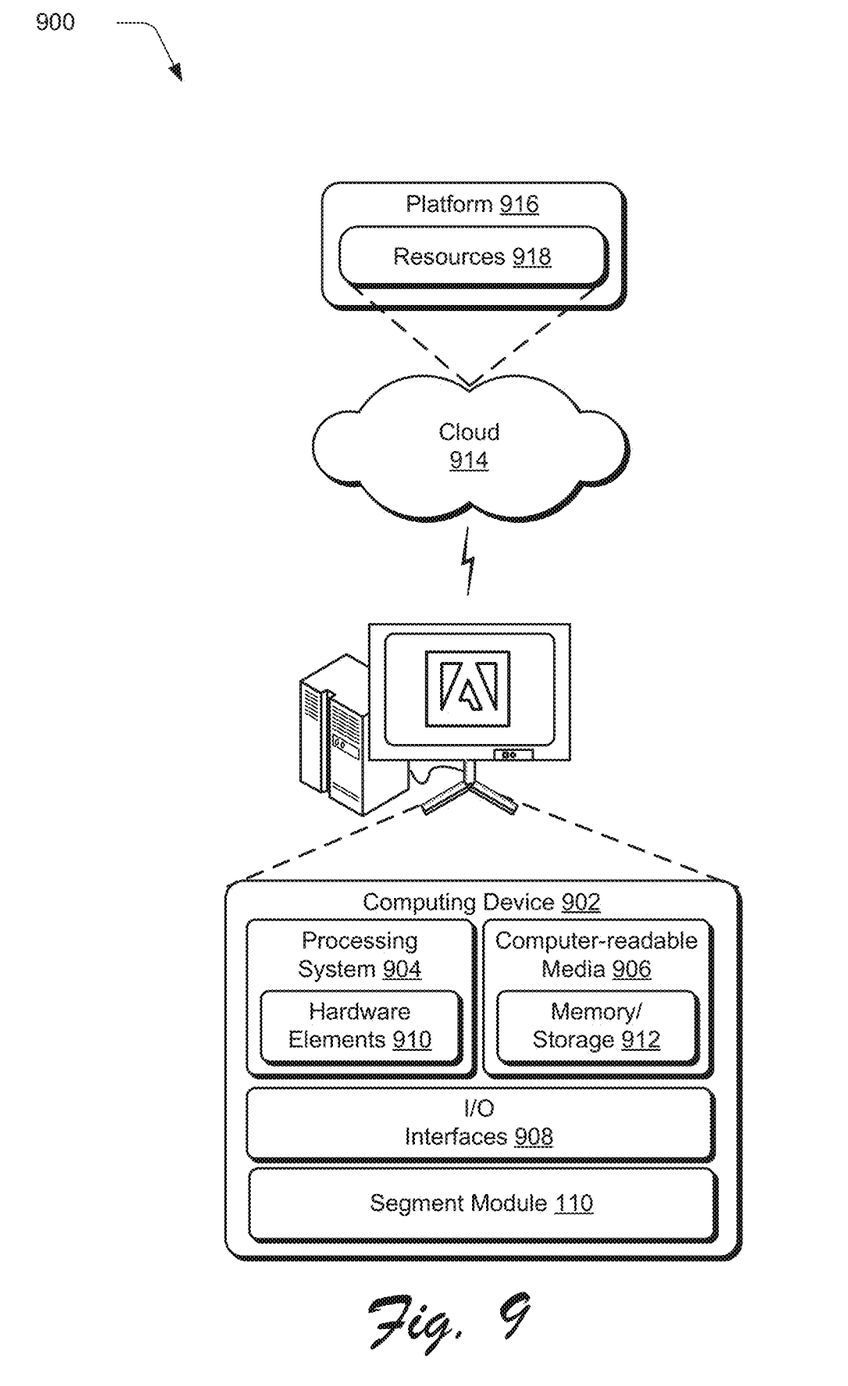
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the segment module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for performing multiple segmentation tasks have been described in language specific to structural features and/or methods, it is to be understood that the appended claims are not necessarily limited to the specific features or methods described. Rather, the specific features and methods are disclosed as example implementations of systems for performing multiple segmentation tasks, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a digital image depicting an object;
computing, by the processing device, per-pixel embeddings for the digital image using a pixel decoder of a machine learning model;
generating, by the processing device, output embeddings using a transformer decoder of the machine learning model based on the per-pixel embeddings for the digital image, input embeddings for a first segmentation task, and input embeddings for a second segmentation task; and
outputting, by the processing device, a first digital image and a second digital image based on the output embeddings, the first digital image depicting the object segmented based on the first segmentation task and the second digital image depicting the object segmented based on the second segmentation task.

2. The method as described in claim 1, wherein the input embeddings for the second segmentation task are generated based on a user input specified relative to the digital image.

3. The method as described in claim 2, wherein the input embeddings for the second segmentation task are generated by performing a region of interest align operation.

4. The method as described in claim 1, wherein the machine learning model is trained on training data describing a first dataset associated with the first segmentation task and a second dataset associated with the second segmentation task.

5. The method as described in claim 4, wherein the machine learning model is simultaneously trained on the training data describing the first dataset and the second dataset.

6. The method as described in claim 1, wherein the first segmentation task is at least one of a panoptic segmentation task, an instance segmentation task, or a semantic segmentation task.

7. The method as described in claim 6, wherein the second segmentation task is at least one of a salient object segmentation task, a human body parsing task, a pose estimation task, or a depth estimation task.

8. The method as described in claim 1, wherein the per-pixel embeddings for the digital image are computed by sampling image features extracted from the digital image using a backbone of the machine learning model.

9. The method as described in claim 1, wherein the input embeddings for the first segmentation task include features learned as part of training the machine learning model on training data.

10. The method as described in claim 9, wherein the training data describes a dataset associated with the second segmentation task.

11. A system comprising:
a memory component; and a processing device coupled to the memory component, the processing device to perform operations comprising:
  receiving input data describing a user annotation of a digital image depicting an object;
  computing input embeddings for the user annotation;
  generating output embeddings using a transformer decoder of a machine learning model based on input embeddings for a segmentation task and the input embeddings for the user annotation; and
  outputting a first digital image and a second digital image based on the output embeddings, the first digital image depicting the object segmented based on the segmentation task and the second digital image depicting the object segmented based on the user annotation.

12. The system as described in claim 11, wherein the segmentation task is at least one of a panoptic segmentation task, an instance segmentation task, a semantic segmentation task, a salient object segmentation task, a human body parsing task, a pose estimation task, or a depth estimation task.

13. The system as described in claim 11, wherein the output embeddings are generated based on per-pixel embeddings for the digital image computed using a pixel decoder of the machine learning model.

14. The system as described in claim 13, wherein the per-pixel embeddings for the digital image are computed by sampling image features extracted from the digital image using a backbone of the machine learning model.

15. The system as described in claim 11, wherein the input embeddings for the user annotation are computed by performing a region of interest align operation.

16. A non-transitory computer-readable storage medium storing executable instructions, which when executed by a processing device, cause the processing device to perform operations comprising:
  receiving input data describing a digital image depicting an object;
  computing per-pixel embeddings for the digital image using a pixel decoder of a single machine learning model;
  generating output embeddings using a transformer decoder of the single machine learning model based on the per-pixel embeddings for the digital image, input embeddings for a first segmentation task, and input embeddings for a second segmentation task; and
  outputting a first digital image and a second digital image based on the output embeddings, the first digital image depicting the object segmented based on the first segmentation task and the second digital image depicting the object segmented based on the second segmentation task.

17. The non-transitory computer-readable storage medium as described in claim 16, wherein the machine learning model is trained on training data describing a first dataset associated with the first segmentation task and a second dataset associated with the second segmentation task.

18. The non-transitory computer-readable storage medium as described in claim 16, wherein the per-pixel embeddings for the digital image are computed by sampling image features extracted from the digital image using a convolutional neural network.

19. The non-transitory computer-readable storage medium as described in claim 16, wherein the input embeddings for the first segmentation task include features learned as part of training the machine learning model on training data describing a dataset associated with the second segmentation task.

20. The non-transitory computer-readable storage medium as described in claim 16, wherein the second segmentation task is based on a user input specified relative to the digital image and the first segmentation task is at least one of a panoptic segmentation task, an instance segmentation task, a semantic segmentation task, a salient object segmentation task, a human body parsing task, a pose estimation task, or a depth estimation task.

* * * * *